(12) United States Patent
Rosin et al.

(10) Patent No.: US 6,993,721 B2
(45) Date of Patent: Jan. 31, 2006

(54) WEB CHANNEL GUIDE GRAPHICAL INTERFACE SYSTEM AND METHOD

(75) Inventors: Robert Rosin, Franklin Lakes, NJ (US); Yumie Sonoda, San Mateo, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 514 days.

(21) Appl. No.: 09/739,938

(22) Filed: Dec. 18, 2000

(65) Prior Publication Data

US 2001/0012024 A1    Aug. 9, 2001

Related U.S. Application Data

(63) Continuation of application No. 09/201,020, filed on Nov. 30, 1998.

(51) Int. Cl.
*G09G 5/00* (2006.01)

(52) U.S. Cl. ............ 715/738; 715/716; 715/718; 715/719; 725/39; 725/40; 725/43

(58) Field of Classification Search ........ 345/763–765, 345/733, 744, 737–739, 716, 717, 721, 719, 345/835, 840, 841; 725/109, 135, 51, 54, 725/39–45; 715/716–723, 736–738
See application file for complete search history.

(56) References Cited

U.S. PATENT DOCUMENTS

| | | | |
|---|---|---|---|
| 5,532,754 A | 7/1996 | Young et al. | 348/569 |
| 5,623,613 A | 4/1997 | Rowe et al. | 395/353 |
| 5,673,089 A | 9/1997 | Yuen et al. | 348/734 |
| 5,818,935 A | 10/1998 | Maa | 380/200 |
| 5,880,768 A | 3/1999 | Lemmons et al. | 348/1 |

(Continued)

FOREIGN PATENT DOCUMENTS

WO    WO 97/23997    *    7/1997

(Continued)

OTHER PUBLICATIONS

Micheal B. Jones, "The Microsoft Interactive TV System: An Experience Report", Jul. 1997.*

*Primary Examiner*—Tadesse Hailu
(74) *Attorney, Agent, or Firm*—Haverstock & Owens LLP

(57) ABSTRACT

In a system and method for enabling a user to navigate among a plurality of internet websites of interest to the user, the system includes a graphical user interface which includes a guide for enabling the user to navigate among the internet websites, and to obtain access to a selected one of the internet websites. The guide includes an array of web channel buttons, each of which includes a web channel number and a web channel title, and each of which is associated with and enables access to at least one internet website. The internet websites associated with each web channel button may comprise internet websites commonly accessed by the user or selected for the user, which are relevant to topics of interest to the user. An internet program guide accessible from the web channel guide enables customization of the at least one internet website associated with each of the array of web channel buttons, so as to enable further access to internet websites of internet to the user. Each web channel button can be efficiently activated to enable selection and access to the internet websites of interest to the user. A guide strip identifies the internet website selected and presented in a display, for integrated navigation between internet websites and television channels.

41 Claims, 4 Drawing Sheets

U.S. PATENT DOCUMENTS

| | | | | |
|---|---|---|---|---|
| 5,905,492 | A | 5/1999 | Straub et al. | 345/762 |
| 5,940,073 | A | 8/1999 | Klosterman et al. | 345/716 |
| 5,959,621 | A * | 9/1999 | Nawaz et al. | 345/764 |
| 5,990,883 | A * | 11/1999 | Byrne et al. | 715/721 |
| 6,003,041 | A * | 12/1999 | Wugofski | 707/104.1 |
| 6,005,565 | A | 12/1999 | Legall et al. | 345/716 |
| 6,025,837 | A | 2/2000 | Matthews, III et al. | 345/716 |
| 6,028,600 | A | 2/2000 | Rosin et al. | 345/716 |
| 6,144,376 | A * | 11/2000 | Connelly | 345/716 |
| 6,177,931 | B1 | 1/2001 | Alexander et al. | 345/327 |
| 6,230,324 | B1 * | 5/2001 | Tomita et al. | 725/51 |
| 6,240,555 | B1 | 5/2001 | Shoff et al. | 725/110 |
| 6,263,501 | B1 * | 7/2001 | Schein et al. | 725/39 |
| 6,268,849 | B1 * | 7/2001 | Boyer et al. | 725/40 |
| 6,272,484 | B1 * | 8/2001 | Martin et al. | 707/1 |
| 6,351,467 | B1 * | 2/2002 | Dillon | 370/432 |
| 6,442,598 | B1 * | 8/2002 | Wright et al. | 709/217 |
| 6,459,427 | B1 * | 10/2002 | Mao et al. | 725/109 |
| 6,594,682 | B2 * | 7/2003 | Peterson et al. | 709/102 |
| 6,604,242 | B1 * | 8/2003 | Weinstein et al. | 725/109 |
| 6,745,245 | B1 * | 6/2004 | Carpenter | 709/229 |
| 2003/0035007 | A1 * | 2/2003 | Wugofski | 345/764 |
| 2003/0066085 | A1 * | 4/2003 | Boyer et al. | 725/104 |

FOREIGN PATENT DOCUMENTS

| | | | |
|---|---|---|---|
| WO | WO 99/35843 | * | 7/1999 |
| WO | WO 99/35845 | * | 7/1999 |

* cited by examiner

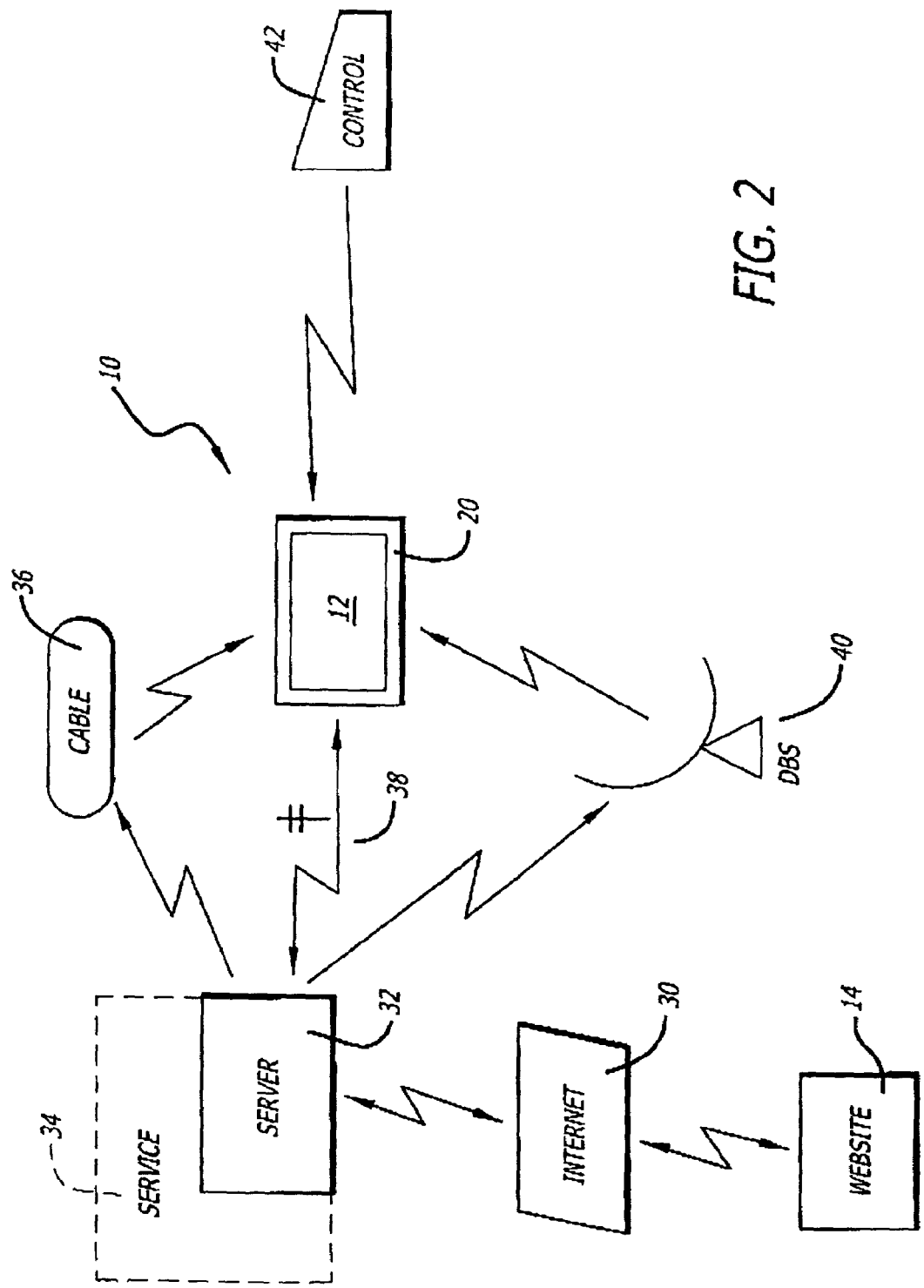

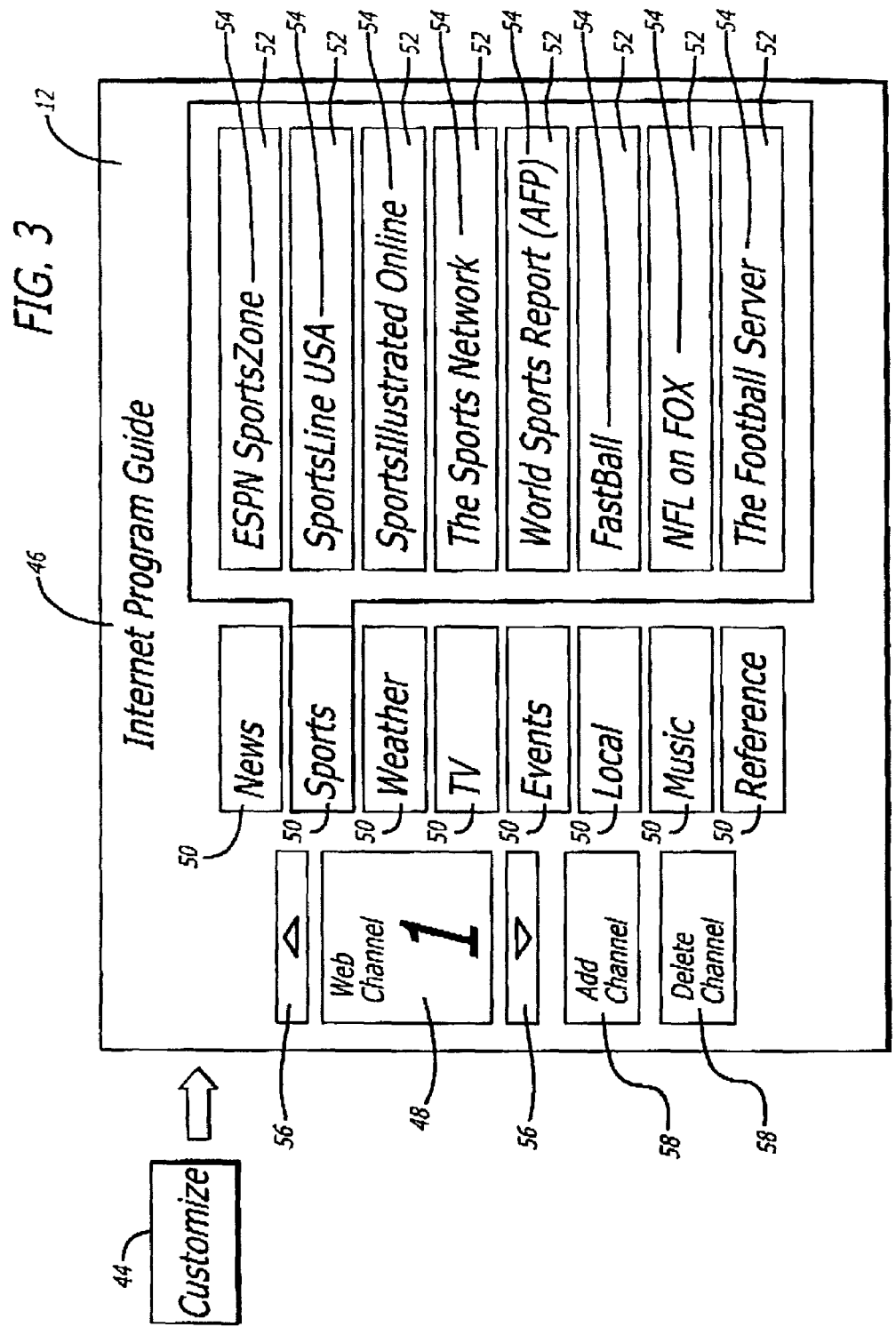

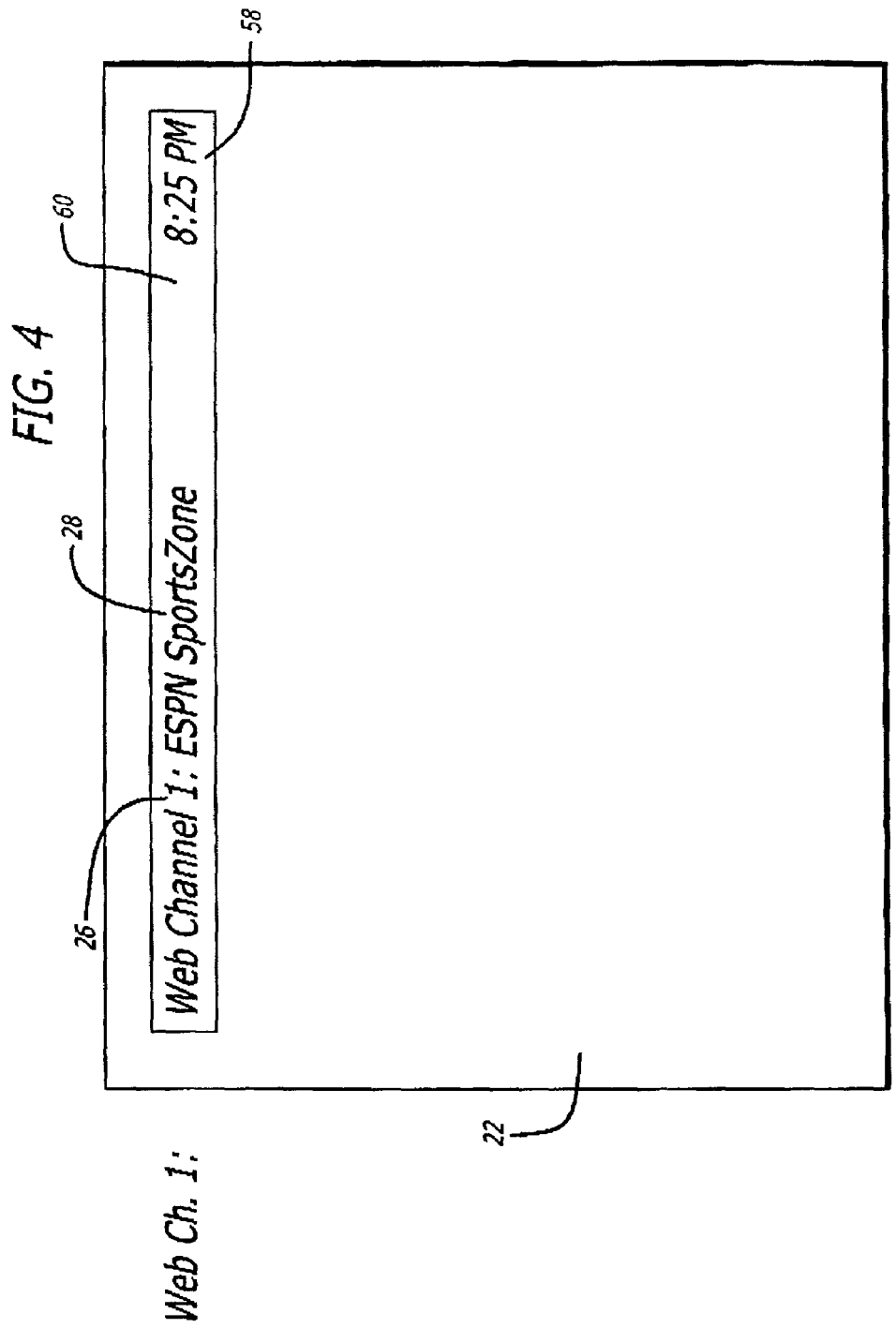

WEB CHANNEL GUIDE GRAPHICAL INTERFACE SYSTEM AND METHOD

RELATED APPLICATIONS

This application is a continuation of application Ser. No. 09/201,020 filed Nov. 30, 1998.

BACKGROUND OF THE INVENTION

1. Field of the Invention

This invention relates generally to improvements in internet website access systems, and, more particularly, to a new and improved system and method for providing a guide for enabling a user to navigate among a plurality of internet websites of interest to the user, to obtain access to a selected one of the plurality of internet websites, and to customize the guide to further enable access to relevant internet websites.

2. Description of the Related Art

It has been known to provide a user with a web browser which is connected to the internet, for enabling the user to access internet website files through a web server maintained by a service provider. The user may generate and customize a list in the web browser of bookmarks for commonly accessed internet websites, which can be accessed from the bookmarks list. However, the user must activate the web browser, activate the bookmark list, and select from the bookmark list in order to obtain access to the listed commonly accessed websites, which may be a relatively slow and difficult process.

Moreover, locating internet websites which are specifically relevant to topics of interest to the user and customizing a listing of such internet websites to enable the user to access such internet websites may be complex and inefficient.

Furthermore, it has been known to provide a user with an internet search engine or directory, for enabling the user to locate internet websites relevant to a particular topic of interest to the user. However, the use of the internet search engines and directories results in delays and complexities associated therewith in seeking to locate relevant internet websites.

Moreover, the internet websites located by the user through the use of internet search engines and directories may not be of substantially high quality and entertainment value in terms of their relevance to topics of interest to the user.

In addition, it has been known to provide systems which combine internet access with television programming access. However, such systems enable access to the internet through web browsers, which have the problems associated therewith as referred to above. Further, navigation in such systems among internet websites accessed through a web browser and the bookmarks or search engines and directories therein has been limited to the channel up/down button and direct access buttons in a television remote control.

Still further, the different interfaces displayed to the user for the television programming identification and for internet website identification can be confusing and disconcerting to the user.

In view of these considerations, effective operational systems are needed to be implemented in an internet website accessing system, to enable the user to efficiently navigate among a plurality of internet websites and obtain access to a selected one thereof.

Therefore, those concerned with the development and use of improved internet website access systems and the like have recognized the need for improved systems and methods for navigating among a plurality of internet websites in categories relevant to topics of interest to the user, accessing a selected one of the plurality of internet websites, and customizing the accessible internet websites.

Accordingly, the present invention fulfills these needs by enabling efficient and effective navigation among a plurality of internet websites and obtain selective access thereto, that is, a system is provided which can enable rapid and ready navigation among a plurality of commonly accessed internet websites, wherein the internet websites are of substantially high quality and entertainment value and are categorized as relevant to topics of interest to the user, while enabling convenient customization of accessible internet websites, and that enables a substantially seamless navigation among internet websites and television channels.

SUMMARY OF THE INVENTION

Briefly, and in general terms, the present invention provides a new and improved system and method for providing a user with a guide, for enabling the user to navigate among a plurality of internet websites of interest to the user, to obtain access to a selected one of the plurality of internet websites, and to customize the guide to further enable access to relevant internet websites, in a convenient and efficient manner.

By way of example, and not by way of limitation, the present invention provides a new and improved system for enabling a user to rapidly and conveniently navigate among and obtain access to internet websites of interest to the user. The internet websites accessible through the system may be internet websites commonly accessed and selected by the user, or internet websites selected for the user which are of substantially high quality and entertainment value, and which are relevant to topics of interest to the user. The system may also enable the user to customize the navigation enabling guide so as to enable further access to relevant internet websites. The system may further enable efficient navigation among the relevant internet websites, and also enable effective integrated navigation between internet websites and television channels.

More particularly, the present invention includes a graphical user interface which includes a web channel guide, including an array of web channel buttons, for enabling rapid and convenient navigation among and access to internet websites of interest to the user. Each web channel button includes a web channel number and a web channel title, and each is associated with at least one internet website.

The system, in accordance with the present invention, also includes internet websites associated with each web channel button which may comprise internet websites commonly accessed and selected by the user, or internet websites selected for the user, which are relevant to topics of interest to the user. The internet websites selected for the user may be selected by a service provider so as to be of substantially high quality and entertainment value.

The system of the present invention further includes an internet program guide for enabling customization of the at least one internet website associated with each of the array of web channel buttons, so as to enable further access to internet websites of interest to the user. The internet website guide is conveniently accessible from the web channel guide.

The system also enables efficient activation of a web channel button for selection by the user of one of the array of web channel buttons, to enable effective navigation among the internet websites of interest to the user.

The system, in accordance with the present invention, further includes a guide strip for identifying the internet website being presented in a manner which enables substantially seamless navigation between internet websites and television channels.

Therefore, one advantage of the present invention is that it includes a comprehensive graphical user interface including a web channel guide for enabling effective and efficient navigation among and access to relevant internet websites of interest to the user.

A further advantage is that the present invention enables selection of internet websites commonly accessed by the user or internet websites selected for the user, which are relevant to topics of interest to the user.

Another advantage is that the present invention enables the user to select internet websites of-substantially high quality and entertainment value as selected for the user.

Still another advantage is that it provides an internet website guide accessible from the web channel guide which enables efficient customization of the internet websites.

Still another advantage is that it enables efficient selection and navigation among the internet websites.

Another advantage is that it provides effective identification of the internet website accessed by the user, to efficiently integrate navigation between the internet websites and television channels.

These and other objects and advantages of the invention will become apparent from the following more detailed description, when taken in conjunction with the accompanying drawings of illustrative embodiments.

BRIEF DESCRIPTION OF THE DRAWINGS

FIG. 2 is a block diagram of a client-server system including the graphical user interface, internet connections, and an accessible internet website in the practice of the invention.

FIG. 3 is a diagram showing an internet program guide in the graphical user interface in accordance with the present invention; and FIG. 4 is a diagram which illustrates a guide strip and an accessed internet website as presented in a display in the present invention.

DETAILED DESCRIPTION OF THE PREFERRED EMBODIMENTS

Figure 1:
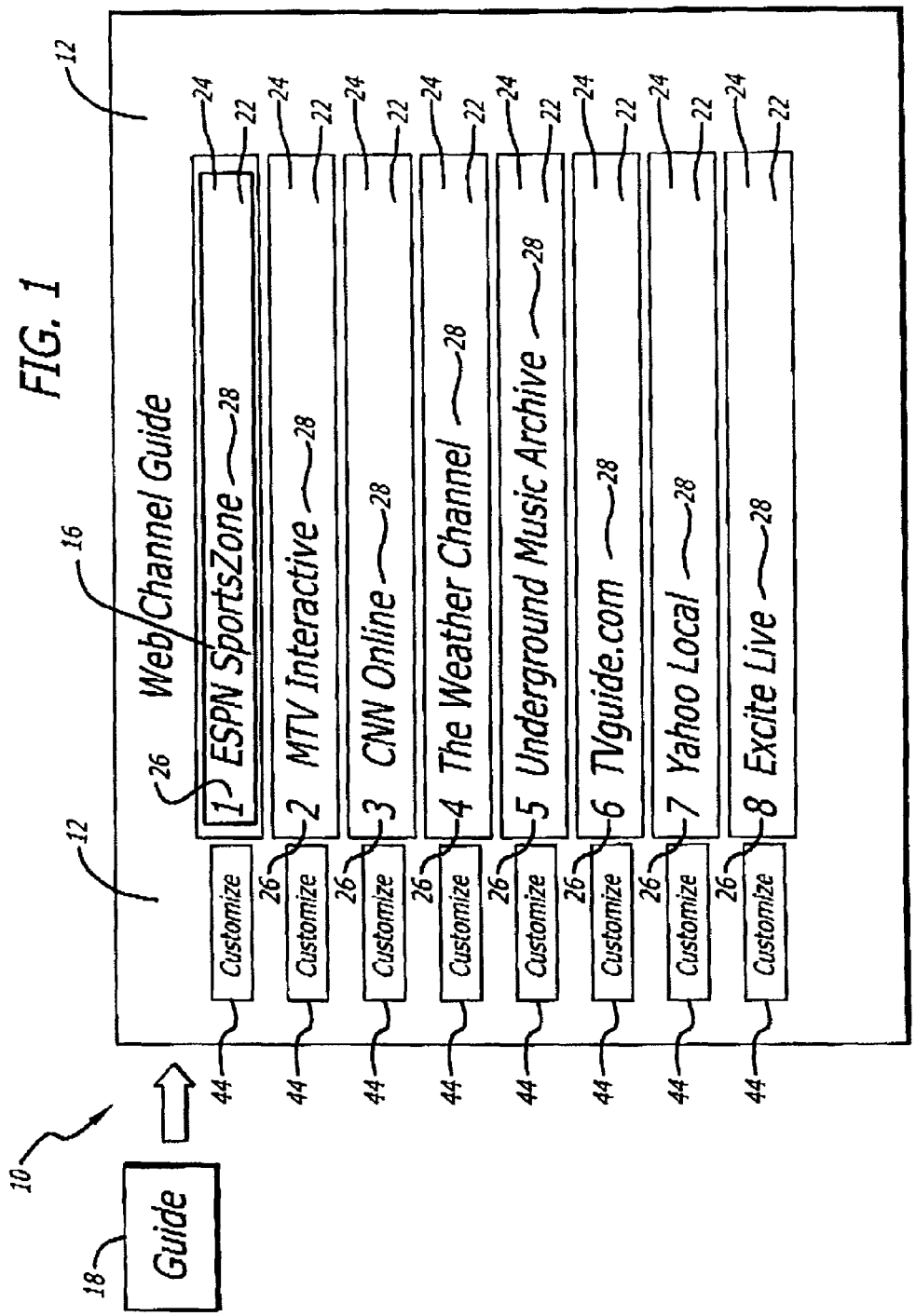
FIG. 1 is a diagram illustrating a graphical user interface which includes a web channel guide in accordance with the present invention.

The present invention is directed to an improved system and method for enabling a user to navigate among a plurality of internet websites of interest to the user, to obtain access to a selected one of the plurality of internet websites, and to customize the accessible internet websites, in a convenient and efficient manner. The improved system and method provides an effective guide for navigating, accessing, and customizing the internet websites relevant to the interest of the user. The preferred embodiments of the improved system and method are illustrated and described herein by way of example only and not by way of limitation.

Referring now to the drawings, wherein like reference numerals denote like or corresponding parts throughout the drawing figures, and particularly to FIGS. 1–4, a system 10 includes a graphical user interface 12 for enabling navigation among and customizable access to a plurality of internet websites 14.

As illustrated in FIGS. 1 and 2, the graphical user interface 12 includes a web channel guide 16, which is accessible by a guide button 18 adapted to be presented in a display 20. The web channel guide 16 includes an array of web channel buttons 22, each of which represents a web channel 24. Each web channel button 22 includes a web channel number 26, and a web channel title 28. Each web channel title 28 represents the title of the associated internet website 14. Each web channel button 22 is also adapted to be associated with at least one of the plurality of the internet websites 14, such that when the user selects a web channel button 22, the associated internet website 14 is presented in the display 20. Alternatively, each of the web channels 24 and the web channel buttons 22 may be associated with a plurality of selectable internet websites 14. The web channel title 28 in each web channel button 22 may also include the uniform resource location (URL) associated with the selected internet website 14. The internet websites 14 associated with each web channel button 22 may comprise internet websites 14 commonly accessed and selected by the user, or Internet websites 14 selected for the user by a service provider, which are relevant to topics of interest to the user. The internet websites 14 which may be selected for the user may be selected by the service provider so as to be of substantially high quality, and may be of substantially high entertainment value.

As shown in FIGS. 1 and 2, association of the internet website 14 with the web channel 24, in the graphical user interface 12 in the display 20, may be provided through connection to the internet 30. The connection to the internet 30 may be provided through a web server 32 operated by a service provider 34. The display 20 may be connected to the server 32, through a set-top box or the like, by a digital cable 36, a telephone modem 38, a digital broadcasting satellite 40, or another system such as a digital subscriber line or the like. The display 20 may comprise a personal computer monitor, to which a personal computer may be connected, a web browser equipped television set, a display terminal, a data telephone, or the like. The display 20 and an associated computer may comprise a client device for the web server 32. The client device may include an internet browser for enabling access to and retrieval of the plurality of the internet websites 14. The client device may further be adapted to enable at least one of the plurality of the internet websites 14 to be downloaded and stored therein, for enabling rapid retrieval thereof.

Referring to FIG. 2, the user may navigate through the graphical user interface 12 and select a web channel 24 to obtain access to the associated internet website 14 by using a control device 42. The control device 42 may comprise a remote control, a computer keyboard, a computer mouse, or the like. The remote control device may include a track ball, a track pad, or the like, in addition to up/down buttons, and direct access buttons, and the keyboard may include function keys, for enabling access thereby to the selected internet website 14 and for selection of the customization process. A track ball, track pad, or the like in a control device 42 may operate in conjunction with a cursor in the graphical user interface 12 for enabling the user to navigate therein.

As seen in FIGS. 1 and 3, the graphical user interface 12 further includes a set of customization buttons 44, each of which is associated with one of the web channels 24. Upon selecting a customization button 44, an internet program guide 46 is presented in the display 20. The internet program guide 46 is adapted to present, for each customization button 44, a window 48 for displaying the web channel number 26, and a set of category buttons 50. Upon selecting one of the category buttons 50, a plurality of internet website buttons 52 associated with the category identified in the category button 50 is presented. Each internet website button 52 is associated with one of the plurality of the internet websites 14. Each internet website button 52 includes an internet website title 54 therein representing the title of the associated internet website 14. The user may then select an internet website button 52, and the corresponding internet website 14, to associate with a web channel 24, to enable access thereto. The internet program guide 46 further includes web channel 24 up and down buttons 56, and buttons 58 for enabling the user to add or delete a web channel 24 displayed in the window 48.

As depicted in FIG. 4, the graphical user interface 12 further includes a guide strip 60, associated with each of the web channel buttons 22. Each guide strip 60 includes the associated web channel number 26, and the associated web channel title 28. The guide strip 60 is presented in the display 20 upon accessing the internet website 14 which is also presented in the display 20.

In the operation of the system 10 in accordance with the present invention, upon activation of the display 20 and connection thereof to the internet 28, the guide button 18 is presented in the display 20. Upon activation of the guide button 18, the web channel guide 16 is presented to the user.

For navigation through the web channels 24, and for selection of a relevant web channel 24 of interest to the user and access to the associated internet website 14, the user may navigate through and select one of the array of web channel buttons 22. The selected internet website 14 may then be presented in the display 20, along with the guide strip 60 identifying the web channel 24 associated with the selected internet website 14. The internet website 14 adapted to be accessed by the user and associated with one of the web channels 24 are internet websites 14 relevant to topics of interest to the user, and may be selected by the user, or selected for the user by an internet service provider. The user may navigate among the plurality of web channel buttons 22 in the web channel guide 16 through the control device 44.

For customization of a web channel 24, to customize the internet websites 14 associated with a web channel 24, a customize button 44 associated with a web channel 24 may be selected in the web channel guide 16. Upon activating the customize button 44, the internet program guide 46 is presented in the display 20. The web channel number 26 of the web channel 24 to be customized is displayed in the window 48. The web channel 24 to be customized may be changed by the user by activating the web channel up and down buttons 56. Web channels 24 may be added or deleted by the user through the add and delete channel buttons 58. The categories buttons 50 for categories of potential interest to the user are then presented in the internet program guide 46.

Upon selection of a category button 50 by the user, the internet website buttons 52 associated with the internet websites 14 relevant to the selected category button 50 are presented to the user, including the currently presented web channel button 22. For example, as shown in FIGS. 1 and 2, upon selection by the user of the category button 50 "Sports", in connection with the "Web Channel 1" selected in the web channel guide 16 and displayed in the window 48 in the internet program guide 46, the internet website buttons 52 relevant to the selected category are presented, including the current web channel button "ESPN Sportgame". If the user wishes to change the internet website button 52 associated with the web channel 24, the user may select another internet website button 52, as for example "FastBall". The newly selected internet website button 52, and the associated internet website 14, will then be associated with the web channel 24, and will be presented to the user.

In accordance with the present invention, the system 10 including the array of web channels 24 and the web channel guide 16 is adapted to enable the user to rapidly and conveniently navigate among and obtain access to the internet websites 14 of interest to the user. Each of the web channels 24 is associated with at least one of the plurality of the internet websites 14. The system 10 is further adapted to enable the internet websites 14 associated with the array of web channels 24 and relevant to topics of interest to the user to be efficiently selected, either by the user from internet websites 14 commonly accessed by the user, or for the user by a service provider. Selection of the associated internet websites 14 for the user by a service provider may increase the likelihood that the internet websites 14 selected are of substantially high quality and of substantially high entertainment value.

Further in accordance with the present invention, the system 10 including the plurality of the category buttons 50 and the plurality of the internet website buttons 52 in the internet program guide 46 is also adapted to enable the user to effectively and efficiently customize the web channel guide so as to enable further access to the relevant internet websites 14. Each of the internet website buttons 52 is associated with one of the plurality of internet websites 14, with one of the plurality of the category buttons 50, and with one of the array of the web channels 24.

The system 10 including the control device 42 is further adapted to enable efficient navigation among the relevant internet websites 14 and the television channels. The control device 42 may include a track ball, track pad, or the like for use in conjunction with a cursor in the graphical user interface 12, for internet website 14 navigation and television channel navigation. The system 10 including the guide strip 58 is also adapted to enable the user to effectively navigation between the internet websites 14 and the television channels in an integrated manner.

It will be apparent from the foregoing that, while particular forms of the invention have been illustrated and described, various modifications can be made without departing from the spirit and scope of the invention. Accordingly, it is not intended that the invention be limited, except as by the appended claims.

What is claimed is:

1. A system for enabling a user to select among and access one of a plurality of Internet websites, comprising:
   a graphical user interface, which includes:
   an Internet website selection-access enabling element for enabling selection of and access to one of a plurality of Internet websites;
   a television channel navigation enabling element for enabling navigation of the one or more television channels;
   a web channel selection-access enabling element for enabling selection of and access to one of an array of web channels upon actuating the Internet website selection-access enabling element, wherein each web channel includes a plurality of selectable categories associated with the web channel and includes a plurality of selectable Internet websites related to and associated with each selectable category; and a web channel customization enabling element for enabling customization of at least one of the array of web channels upon actuating the web channel selection-access enabling element so as to enable selection of one of the plurality of selectable categories associated with the web channel and selection of one of the plurality of selectable Internet websites related to and associated with each selectable category;

wherein the Internet website selection-access enabling element comprises a guide button;

wherein the web channel selection-access enabling element comprises a web channel guide window, adapted to be accessed upon actuation of the guide button, the web channel guide window including an array of web channel buttons, each web channel button being associated with a web channel and adapted to be actuated to enable access to the associated web channel, and including an array of customization buttons, each customization button being associated with one of the array of web channel buttons; and wherein the web channel customization enabling means element comprises an Internet program guide window, adapted to be accessed upon actuating one of the array of customization buttons, the Internet program guide window including an array of selectable category buttons and an array of website buttons associated with each category button.

2. The system of claim 1, wherein the graphical user interface further includes a web channel guide in which the array of the web channels is presented.

3. The system of claim 1, further comprising navigating means for enabling the user to navigate among the array of the web channels.

4. The system of claim 3, wherein the navigating enabling means comprise a remote control device.

5. The system of claim 3, wherein the navigating enabling means comprise a keyboard which includes function keys for enabling navigating among the web channels.

6. The system of claim 3, wherein the navigating enabling means comprise a mouse device.

7. The system of claim 3, wherein the navigating enabling means include means for enabling the user to move up and down among the web channels.

8. The system of claim 3, wherein the navigating means include means for enabling direct access to a selected one of the web channels.

9. The system of claim 1, further comprising displaying means for displaying the graphical user interface.

10. The system of claim 9, wherein the displaying means comprise a display monitor.

11. The system of claim 9, wherein the displaying means comprise a television display.

12. The system of claim 1, further comprising web channel identifying means for identifying the web channel being presented, upon presenting the web channel.

13. The system of claim 12, wherein the web channel identifying means comprise a guide strip adapted to be presented upon presenting the web channel.

14. The system of claim 11, wherein the guide strip is adapted to include a web channel number and a web channel title representing the associated web channel.

15. The system of claim 1, further comprising access enabling means for enabling the web channel selection-access enabling element to access an Internet website selected by the user.

16. The system of claim 15, wherein the access enabling means comprise a digital cable system.

17. The system of claim 15, wherein the access enabling means comprise a telephone modem.

18. The system of claim 15, wherein the access enabling means comprise a digital broadcast satellite system.

19. The system of claim 15, wherein the access enabling means comprise a web server.

20. The system of claim 1, further comprising a client device including an Internet browser for enabling access to and retrieval of the plurality of the Internet websites.

21. The system of claim 20, further comprising means for enabling at least one of the plurality of Internet websites to be downloaded and stored in the client device.

22. The system of claim 1, further comprising means for enabling the displaying of the web channel guide, wherein the displaying enabling means are further adapted to enable the displaying of the plurality of the associated Internet websites.

23. The system of claim 1, further comprising a client device, and means for enabling a plurality of the Internet websites associated with the plurality of the web channels to be accessed from the client device.

24. The system of claim 1, wherein each of the plurality of the web channels comprises one of a plurality of the Internet websites which is commonly accessed by the user.

25. The system of claim 1, wherein each of the plurality of the Internet websites comprises one of the plurality of the Internet websites which is selected for the user.

26. The system of claim 1, wherein the plurality of the Internet websites associated with each of the plurality of the web channels comprises a group of the Internet websites categorized for the user based on content.

27. The system of claim 1, wherein the web channel customization enabling element includes a plurality of customizing buttons, each of which is adapted to be associated with one of the array of the web channels.

28. The system of claim 27, further comprising an Internet program guide adapted to be accessible through the graphical user interface through use of one of the plurality of customizing buttons associated with one of the array of web channels.

29. The system of claim 1, wherein the web channel customization enabling element includes a plurality of category buttons adapted to be associated with each of the array of the web channels.

30. The system of claim 29, wherein each of the plurality of category buttons includes a plurality of Internet website buttons, each Internet website button being adapted to be associated with one of the plurality of selectable Internet websites.

31. The system of claim 30, wherein each of the Internet website buttons includes an Internet website title representing the associated Internet website.

32. The system of claim 1, wherein each of the plurality of the web channel buttons includes a web channel number and a web channel title representing the associated Internet website.

33. The system of claim 32, wherein each of the plurality of the web channel buttons includes a uniform resource locator representing the associated Internet website.

34. A method of enabling a user to select among and access one of a plurality of Internet websites and one or more television channels, in a system which includes:

a graphical user interface including:

an Internet website selection-access enabling element for enabling selection of and access to one of a plurality of Internet websites, a television channel navigation enabling element for enabling navigation of the one or more television channels, a web channel selection-access enabling element for enabling selection of and access to one of an array of web channels upon actuating the Internet website selection-access enabling element, wherein each web channel includes a plurality of selectable categories associated with the web channel and includes a plurality of selectable Internet websites related to and associated with each selectable category, and a web channel customization enabling element for enabling customization of at least one of the array of web channels upon actuating the web channel selection-access enabling elements so as to enable selection of one of the plurality of selectable categories associated with the web channel and selection of one of the plurality of selectable Internet websites related to and associated with each selectable category;

wherein the method comprises:

enabling the displaying of the graphical user interface;

enabling the displaying of the array of the web channels;

enabling the navigation of the one or more television channels within the graphical user interface;

enabling the user to select one of the array of the web channels and to obtain access to one of the plurality of the related and associated Internet websites; and enabling the user to customize at least one of the array of web channels;

wherein the Internet website selection-access enabling element comprises a guide button;

wherein the web channel selection-access enabling element comprises a web channel guide window adapted to be accessed upon actuation of the guide button, the web channel guide window including an array of web channel buttons, each web channel button being associated with a web channel and adapted to be actuated to enable access to the associated web channel, and including an array of customization buttons, each customization button being associated with one of the array of web channel buttons;

wherein the web channel customization enabling element comprises an Internet program guide window adapted to be accessed upon actuating one of the array of customization buttons, the web channel customization enabling element including an array of selectable category buttons and an array of website buttons associated with each category button;

wherein web channel selection and Internet website access comprise actuating the guide button to access the web channel guide window and actuating a selected web channel button and wherein web channel customization enabling comprises actuating a customization button to access the Internet program guide window, and actuating a selected category button to select an associated website button.

35. The method of claim 34, wherein each of the array of the web channels is adapted to be associated with a plurality of the Internet websites, and wherein enabling the displaying of the array of the web channels further comprises enabling the selection of one of the plurality of the Internet websites associated with each of the array of the web channels.

36. The method of claim 34, wherein the system further comprises means for displaying the graphical user interface, and wherein the method further comprises displaying the graphical user interface.

37. The method of claim 34, wherein the system further comprises means for identifying the web channel being presented upon presenting the web channel, and wherein the method further comprises presenting a web channel and identfying the web channel being presented.

38. The method of claim 34, wherein the system further comprises a client device, the client device including an Internet browser for enabling access to and retrieval of the plurality of the Internet websites, and wherein the method further comprises enabling the Internet browser to access and retrieve the plurality of the Internet web sites.

39. A system for enabling a user to select among and access one of a plurality of Internet websites and one or more television channels; comprising:

a graphical user interface, which includes:

an Internet website selection-access enabling element for enabling selection of and access to one of a plurality of Internet websites;

a television channel navigation enabling element for enabling navigation of the one or more television channels, wherein television content corresponding to a television channel is displayed when the television channel is selected;

a web channel selection-access enabling element for enabling selection of and access to one of an array of web channels upon actuating the Internet website selection-access enabling element, wherein each web channel includes a plurality of selectable categories associated with the web channel and a plurality of selectable Internet websites related to and associated with each selectable category; and a web channel customization enabling element for enabling customization of at least one of the array of web channels upon actuating the web channel selection-access enabling elements so as to enable selection of one of the plurality of selectable categories associated with the web channel and selection of one of the plurality of selectable Internet websites related to and associated with each selectable category;

wherein the Internet website selection-access enabling element comprises a guide button;

wherein the web channel selection-access enabling element comprises a web channel guide window adapted to be accessed upon actuation of the guide button, the web channel guide window including an array of web channel buttons, each web channel button being associated with a web channel and adapted to be actuated to enable access to the associated web channel, and an array of customization buttons, each customization button being associated with one of the array of web channel buttons; and wherein the web channel customization enabling element comprises an Internet program guide window adapted to be accessed upon actuating one of the array of customization buttons, the web channel customization enabling element including an array of selectable category buttons and an array of website buttons associated with each category button.

40. A system for enabling a user to select among and access one of a plurality of Internet websites and one or more television channels; comprising:

a graphical user interface, which includes:

an Internet website selection-access enabling element for enabling selection of and access to one of a plurality of Internet websites;

a television channel navigation enabling element for enabling navigation of the one or more television channels, wherein a broadcast corresponding to a television channel is displayed when the television channel is selected;

a web channel selection-access enabling element for enabling selection of and access to one of an array of web channels upon actuating the Internet website selection-access enabling element, wherein each web channel includes a plurality of selectable categories associated with the web channel and a plurality of selectable Internet websites related to and associated with each selectable category; and a web channel customization enabling element for enabling customization of at least one of the array of web channels upon actuating the web channel selection-access enabling elements so as to enable selection of one of the plurality of selectable categories associated with the web channel and selection of one of the plurality of selectable Internet websites related to and associated with each selectable category;

wherein the Internet website selection-access enabling element comprises a guide button;

wherein the web channel selection-access enabling element comprises a web channel guide window adapted to be accessed upon actuation of the guide button, the web channel guide window including an array of web channel buttons, each web channel button being associated with a web channel and adapted to be actuated to enable access to the associated web channel, and an array of customization buttons, each customization button being associated with one of the array of web channel buttons; and wherein the web channel customization enabling element comprises an Internet program guide window adapted to be accessed upon actuating one of the array of customization buttons, the Internet program guide window including an array of selectable category buttons and an array of website buttons associated with each category button.

41. A graphical user interface comprising:

an Internet website selection-access enabling element for enabling selection of and access to one of a plurality of Internet websites;

a television channel navigation enabling element for enabling navigation of the one or more television channels;

a web channel selection-access enabling element for enabling selection of and access to one of an array of web channels upon actuating the Internet website selection-access enabling element, wherein each web channel includes a plurality of selectable categories associated with the web channel and includes a plurality of selectable Internet websites related to and associated with each selectable category; and a web channel customization enabling element for enabling customization of at least one of the array of web channels upon actuating the web channel selection-access enabling elements so as to enable selection of one of the plurality of selectable categories associated with the web channel and selection of one of the plurality of selectable Internet websites related to and associated with each selectable category;

wherein the Internet website selection-access enabling element comprises a guide button;

wherein the web channel selection-access enabling element comprises a web channel guide window adapted to be accessed upon actuation of the guide button, the web channel guide window including an array of web channel buttons, each web channel button being associated with a web channel and adapted to be actuated to enable access to the associated web channel, and including an array of customization buttons, each customization button being associated with one of the array of web channel buttons; and wherein the web channel customization enabling element comprises an Internet program guide window adapted to be accessed upon actuating one of the array of customization buttons, the Internet program guide window including an array of selectable category buttons and an array of website buttons associated with each category button.

* * * * *

UNITED STATES PATENT AND TRADEMARK OFFICE
CERTIFICATE OF CORRECTION

PATENT NO. : 6,993,721 B2  Page 1 of 1
DATED : January 31, 2006
INVENTOR(S) : Robert Rosin et al.

It is certified that error appears in the above-identified patent and that said Letters Patent is hereby corrected as shown below:

<u>Column 7,</u>
Line 21, delete "means".
Line 59, change "11" to -- 13 --.

Signed and Sealed this

Eighteenth Day of April, 2006

JON W. DUDAS
*Director of the United States Patent and Trademark Office*